Patented Mar. 24, 1936

2,034,994

UNITED STATES PATENT OFFICE 2,034,994

HEAT ABSORBING GLASS

Donald Ellsworth Sharp and James Bailey, Hamburg, N. Y., assignors to Mississippi Glass Company, New York, N. Y., a corporation of New York No Drawing. Application June 26, 1933, Serial No. 677,681

8 Claims. (Cl. 106—36.1)

It is well known to those skilled in glass manufacture that glass may be given the property of absorbing infra-red radiations by incorporating in it some iron in the reduced or ferrous state. However, as heretofore produced, such glasses have possessed a number of disadvantages, which we have ascertained to be due in general to the means employed for obtaining the necessary reducing conditions in melting the batch. For example, the glass produced may have a strong greenish color, or even an amber color, and in either case the light transmission may be too low for efficient results. Moreover, the glass may contain an excessive number of small bubbles which are difficult to remove. Heat absorbing glasses as heretofore made are therefore likely to vary in color and in other physical properties.

One object of this invention is the provision of an improved glass of good heat-absorbing power which may at the same time be pale in color. Another object is to provide a heat-absorbing glass which will have good transparency to visual rays. A further object is to provide a process of making glass of the kind indicated, which can be produced with substantial uniformity of product at reasonable cost.

We have discovered that even lime glass, which is inexpensive to manufacture, can be given the advantageous properties set forth above. For example we have found that the iron may best be introduced as ferrous sulfate, although other ferrous compounds, and in some cases ferric compounds, may be used, as is known in the art. However, a reducing agent is necessary and for this purpose we employ by preference two such agents, one carbonaceous and the other a metal, preferably aluminum. If carbon alone is used it is a difficult matter to adjust the amount so that sufficient reduction is obtained without danger of producing an amber color from an excess of carbon. If aluminum is used alone, difficulty is often encountered in adjusting the amount so that there will be no danger of obtaining bubbly glass when an excess of the metal is used, and yet incorporating enough of the metal to insure the desired reduction. We have found that this danger can be largely overcome if the reducing properties of the metal are utilized in the presence of antimony oxide, but we have also found it comparatively easy to obtain the desired reducing conditions without the effects due to an excess of reducing agent if approximately equal parts are used of carbon and metallic aluminum, and we have further discovered that this result is obtained with still greater ease when antimony oxide is present in the glass batch in an amount at least about twice the total amount of the reducing agent or agents employed.

While we are not able to explain with certainty why such a combination (carbon, a metallic reducing agent, and antimony oxide) obtains the desired result, we believe the antimony oxide acts to upset the normal temperature equilibrium existing between ferrous and ferric oxides, permitting the reducing agents to exercise their true function to a more efficient degree, the carbon exercising its reducing action most efficiently in one range of temperature while the metallic reducing agent exercises its reducing action most efficiently in another range; the result of the combination being to keep the iron in the reduced condition over the entire range of temperature employed in the melting process. If either reducing agent were to be employed alone an excess would be necessary to obtain sufficient reduction in that portion of the temperature range in which it is least efficient. Although we have not been able to prove that this is the actual modus operandi involved, we nevertheless believe that it is a true explanation of the matter. In addition to the above mentioned ingredients we may add a small amount of cobalt to the glass if it is desired to obtain more of the bluish shade or tinge without materially increasing the absorption of visual rays. The addition of the cobalt is without material effect upon the heat absorption. Its chief purpose is the counteracting of any slight transmission of yellow light, which might be undesirable.

The composition of the batch may vary considerably, both qualitatively and quantitatively, according to the particular kind of glass which is to be produced. The proportions given below are approximate. In the case of lime glass the batch may contain, in pounds or other parts by weight: sand (silica) 1000; soda ash (sodium carbonate) 200 to 400; limestone (calcium carbonate) 200 to 400; feldspar (aluminum-potassium silicate) 0 to 100; saltcake (sodium sulphate) 0 to 100; ferrous sulphate 10 to 50; antimony oxide 10 to 100; charcoal 1 to 8; aluminum 1 to 8; cobalt oxide 0.02 to 0.3. In the ranges just given the following have been found to be especially advantageous:

| Batch No. | 1 | 2 | 3 | 4 | 5 |
|---|---|---|---|---|---|
| Sand | 1000 | 1000 | 1000 | 1000 | 1000 |
| Soda ash | 320 | 320 | 320 | 400 | 320 |
| Limestone | 350 | 350 | 350 | 280 | 350 |
| Feldspar | 60 | 60 | 60 | 60 | 60 |
| Saltcake | 50 | 50 | 50 | 50 | 50 |
| Ferrous sulfate | 20 | 20 | 20 | 30 | 40 |
| Antimony oxide | 14 | 14 | 14 | 14 | 20 |
| Charcoal | 6 | 2 | 2 | 2.5 | 2 |
| Aluminum | 1.75 | 1.7 | 1.7 | 2 | 2.5 |
| Cobalt oxide | 0.04 | 0.04 | | | |

Batch No. 1 yields a glass of greenish color, No. 2 a blue color, No. 3 a light green, while Nos. 4 and 5 give a light blue-green. Tests on glass produced from No. 2, in a thickness of 5.55 mm., gave an average transmission of visual light of about 71 per cent and a radiant heat transmission of about 24 per cent. In each case the source of radiation was a 100-watt electric bulb.

As stated above, considerable variation in the batch is possible without departing from the spirit of our invention. For example, we have found that the benefits of our invention may still be obtained when borax is substituted for more or less of the soda if it is desired to reduce the thermal expansion of the glass. Magnesia may replace part of the calcium. In such cases the antimony oxide may with advantage be increased. The cobalt oxide may be adjusted in amount so that the resultant product may be a bluish green, a pale green, or a blue.

We claim:

1. In the production of heat-absorbing glass containing iron in substantially the ferrous condition only, melting a batch containing iron, antimony oxide, and metallic aluminum as a reducing agent.

2. In the production of heat-absorbing glass containing iron in substantially the ferrous condition only, melting a batch containing iron, antimony oxide, and metallic aluminum and carbonaceous material as reducing agents.

3. In the production of heat-absorbing glass by melting a batch containing a substantial amount of ferrous iron, the improvement comprising maintaining reducing conditions in the melt by means of a carbonaceous reducing agent and aluminum metal in the presence of antimony oxide.

4. In the production of heat-absorbing glass, the improvement comprising melting a batch containing ferrous sulfate, and maintaining reducing conditions in the melt by means of a carbonaceous reducing agent and aluminum metal in the presence of antimony oxide.

5. In the production of heat-absorbing glass, the improvement comprising melting a batch containing ferrous sulfate, and maintaining reducing conditions in the melt by means of a carbonaceous reducing agent and aluminum metal in equal amounts in the presence of antimony oxide.

6. In the production of heat-absorbing glass, the improvement comprising melting a batch containing ferrous sulfate, and maintaining reducing conditions in the melt by means of a carbonaceous reducing agent and aluminum metal in equal amounts in the presence of antimony oxide in amount not less than the total of the reducing agents.

7. In the production of heat-absorbing glass, the improvement comprising melting a batch containing, in parts by weight, sand 1000, soda ash 200 to 400, limestone 200 to 400, ferrous sulfate 10 to 50; and maintaining reducing conditions in the melt by means of carbon and aluminum metal in substantially equal amounts but in total from 2 to 16 parts, in the presence of 10 to 100 parts of antimony oxide.

8. In the production of heat-absorbing glass, the improvement comprising melting a batch containing, in parts by weight, sand 1000, soda ash 320, limestone 350, feldspar 60, saltcake 50, ferrous sulphate 20, cobalt oxide 0.04; and maintaining reducing conditions in the melt by means of carbon 2 and aluminum metal 1.75, in the presence of 10 to 40 parts of antimony oxide.

DONALD ELLSWORTH SHARP.
JAMES BAILEY.